United States Patent [19]
Gerhauser et al.

[11] 3,814,312
[45] June 4, 1974

[54] TEMPERATURE CONTROL DEVICE

[75] Inventors: Merton F. Gerhauser, Cleveland, Ohio; Emil O. Young, deceased, late of Beachwood, Ohio by Gladys R. Young, executrix

[73] Assignee: Young Regulator Company, Warrensville, Ohio

[22] Filed: Aug. 4, 1972

[21] Appl. No.: 277,890

[52] U.S. Cl.................. 236/49, 236/78, 317/471
[51] Int. Cl............................................. F24f 11/04
[58] Field of Search............ 236/49, 1 B, 1 C, 78 C; 165/26; 317/471

[56] References Cited
UNITED STATES PATENTS

| | | | |
|---|---|---|---|
| 2,113,207 | 4/1938 | Yingling | 236/49 X |
| 2,479,243 | 8/1949 | Larsen | 236/49 |

*Primary Examiner*—William E. Wayner
*Attorney, Agent, or Firm*—Woodling, Krost, Granger & Rust

[57] ABSTRACT

A temperature control device for a zone heating and cooling system is disclosed wherein each zone can be individually temperature controlled by a modulation action of the temperature control device. Each zone has a temperature sensor and a movable member to vary the aperture of the air duct to the zone. Each temperature sensor has a first and a second contact with a bimetal therebetween. The sensor means controls hot air with the movable member through a reversible motor to open the aperture when the temperature of the room is below a first reference temperature and to close the aperture when the temperature is above a second reference temperature. The device includes a control element means to reverse the motor function and simultaneously switch all zones from a heating system to an air-conditioning system. The foregoing abstract is merely a resume of one general application, is not a complete discussion of all principles of operation or applications, and is not to be construed as a limitation on the scope of the claimed subject matter.

9 Claims, 5 Drawing Figures

PATENTED JUN 4 1974 3,814,312

TEMPERATURE CONTROL DEVICE

BACKGROUND OF THE INVENTION

Present trends in the heating and cooling of modern buildings have been directed towards a central heating and cooling unit and an air duct system to direct air flow to a plurality of zones wherein each zone has an individual temperature control device. The central heating and cooling unit is easily accessible for maintenance and the entire system is cheaper and more efficient than having separate heating and cooling units in each zone. However, the requirements of a temperature control device in each zone adds to the complexity of the heating and cooling system. Each zone must have a temperature sensor device coupled to an air flow control device to vary the air flow from the main duct into the zone in accordance with the temperature in the zone. In general, the air flow control devices are motorized air gates which are connected to a temperature sensor device to open or close the gates in accordance with whether additional heat or additional cool air is required. The motorized air gates generally require limit switches to avoid motor burn out during a stall when the air gate is in a minimum or maximum position. In addition, many of the temperature control devices operate on 120 volt line voltage requiring special cable to interconnect the air flow control device and the temperature sensor device.

Perhaps the most prominent disadvantage of this type of temperature control device is the fact that the temperature control devices in each zone must be switched from a heating position to a cooling position in accordance with whether hot or cool air is flowing through the air duct from the central heating and cooling unit.

Therefore, an object of this invention is to produce a temperature control device having a control element to switch all temperature control devices from a heating condition to a cooling condition.

Another object of this invention is to produce a temperature control device which does not require expensive limit switches in the motorized air gates.

Another object of this invention is to produce a temperature control device wherein interconnections between components can be made with standard low voltage thermostat wire to avoid stringent requirements for line voltage operation.

Another object of this invention is to produce a temperature control device which is versatile, reliable and inexpensive.

SUMMARY OF THE INVENTION

The invention may be incorporated in a temperature control device for a heating and cooling air flow system having an air duct, comprising in combination, power means having a first and a second source terminal, sensor means, control means, and control element means having a first and a second position; and sensor means including; first and second sensor contact means, temperature responsive means connecting said first sensor contact means to said second source terminal when the ambient temperature is above a first reference and connecting said second sensor contact means to said second source terminal when the ambient temperature is below a second reference, said control means including; movable member means to vary the aperture of the air duct to control air flow therethrough, motor means having a first and second motor winding means, mounting means mounting said motor means to the air duct, means connecting said motor means to said movable member means to decrease the aperture when said first motor winding means is energized and to increase the aperture when the second motor winding means is energized, means connecting said motor means to said first source terminal, reversing switch means interconnecting said motor means and said sensor contact means; and said control element means controlling said reversing switch means to connect said first and second motor winding means to said first and second sensor contact means, respectively, when in said first position and connecting said first and second motor winding means to said second and first sensor contact means, respectively, when in said second position.

Other objects and a fuller understanding of the invention may be had by referring to the following description and claims, taken in conjunction with the accompanying drawing.

DESCRIPTION OF THE PREFERRED EMBODIMENT

Figure 1:
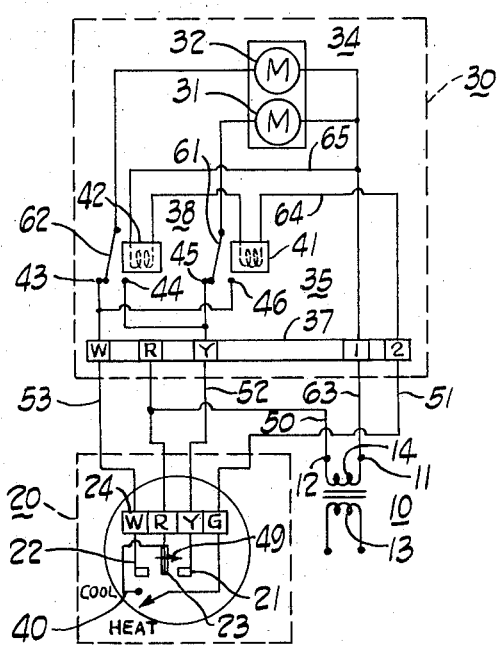
FIG. 1 is a schematic diagram of the preferred embodiment illustrating a temperature control device.

FIG. 1 illustrates a temperature control device for a heating and a cooling air flow system having an air duct which comprises power means 10, sensor means 20, control means 30 and control element means 40. The power means 10 is shown as a transformer having a primary 13 and a secondary 14 wherein the secondary has a first and a second source terminal 11 and 12, respectively. The transformer can be a step-down transformer whereby a 120-volt line voltage applied to the primary 13 will produce a 25-volt secondary voltage in order that interconnections between the sensor means 20 and the control means 30 can be accomplished by using simple bell wire instead of a more sophisticated wiring for 120 volts as required by some statutes and ordinances.

The sensor means 20 includes first and second sensor contact means 21 and 22 which are shown connected to the Y and W contacts of the terminal block 24, respectively. A temperature responsive means 23 is connected by a connector 50 to the second source terminal 12. The temperature responsive means 23 can be bimetallic means whereby an increase in temperature will cause a bending of the temperature responsive means 23 as indicated by the arrow 49. The temperature responsive means 23 is shown connected to the terminal block 24 to connect the first sensor contact means 21 with the second source terminal 12 when the ambient temperature is above a first reference temperature whereat the temperature responsive means 23 is bent to contact the first sensor contact means 21. The temperature responsive means 23 also connectes the second source terminal 12 with the second sensor contact means 22 when the ambient temperature is below a second reference temperature whereat the temperature responsive means 23 is bent to contact the second sensor contact means 22. The temperature difference between the first and second references is greater than 1° and typically can be many degrees.

Figure 4:
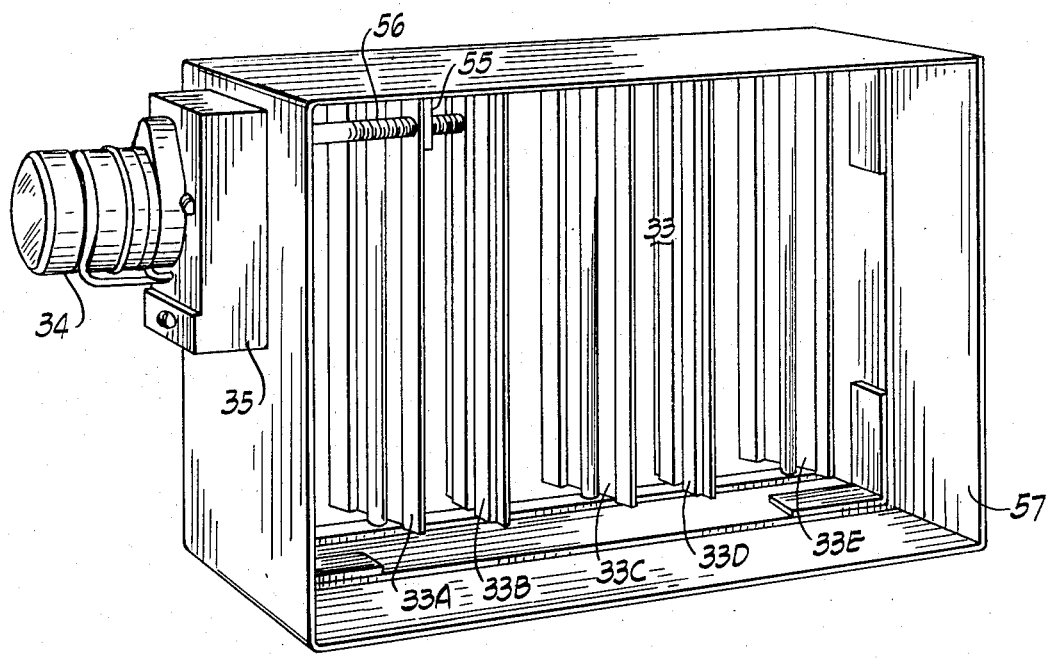
FIG. 4 illustrates control means for controlling air flow through an air duct.
Figure 5:
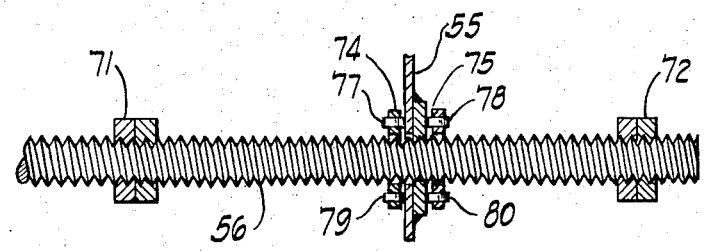
FIG. 5 illustrates a washer bearing used in the control means shown in FIG. 4.

The control means 30 includes movable member means 33 shown in FIG. 4 to vary the aperture of the air duct and to control the air flow therethrough. The housing 57 can be located within or at the end of the air duct. The movable member means 33 are shown as a plurality of surfaces 33A–33E which are each rotatable about an axis which rotation is controlled by the linear movements of an arm member 55. The motor-means 34 as shown in FIG. 1 includes first and second motor winding means 31 and 32 arranged in such a manner such that the motor means 34 rotates in a first direction when the first motor winding means 31 is energized and rotates in a second direction when the second motor winding means 32 is energized. The motor means 34 shown in FIGS. 1 and 4 is composed of two synchronous motors mounted on a common shaft which comprise the first and second motor winding means, respectively. The use of two synchronous motors has the advantage in that the motor means 34 can sustain a stall for an indefinite period of time without any damage to the windings thereof. Hence, the use of a reversible synchronous motor or plurality of synchronous motors wound in opposition to one another eliminates the need for costly limit switches when the movable member means 33 is stopped at a minimum or a maximum position. The motor means 34 is mounted to the housing 57 of the movable member means 33 by mounting means 35. The motor means 34 is connected through a gear reduction and by connecting means 56 shown as a screw thread to engage with the arm member 55 which controls the movable member means 33 to decrease the aperture of air flow through the movable member means 33 when the motor means rotates in the first direction and to increase the aperture of the movable member means 33 when the motor means rotates in the second direction. FIG. 5 illustrates the screw thread 56 engaged with the arm member 55 which screw thread 56 is connected to the motor means 34. The travel of the arm member 55 is limited by the stops 71 and 72 which are each illustrated as two nuts which are jammed together to prevent rotation, relative to the screw thread 56. To prevent the arm member 55 from jamming against either one of the mechanical stops 71 and 72, bearing washers 74 and 75 are placed on either side of the arm member 55 to allow the arm member to abut against either of the mechanical stops 71 and 72 without jamming. The bearing washers 74 and 75 each have a plurality of thrust roller bearings 77–80 which simultaneously engage with the arm member 55 and one of the mechanical stops 71 and 72 when the movement of the arm member has reached an extreme left or right position. Only the roller bearing 77–80 simultaneously engage with the arm member and the mechanical stops thereby eliminating the possibility of jamming between the arm member 55 and one of the mechanical stops 71 or 72. Thus, the energizing of either the first or second motor winding means 31 and 32 of the motor means 34 changes the air flow through the air duct.

The motor means 34 is connected to the first source terminal 11 of the power means 10 by conductor 63. Reversing switch means 38 interconnect the motor means 34 with the sensor contact means 21 and 22. The reversing switch means 38 is shown as a first and a second relay 41 and 42 having switching contacts 61 and 62, respectively. The first and second relays 41 and 42 are illustrated as separate relays for the sake of simplicity but it is well known to one skilled in the art that a plurality of circuits can be switched with the single relay having a single coil. The coils of the first and second relays 41 and 42 are connected to the first source terminal 11 by conductors 63 and 65 and are interconnected to the control element means 40 by conductors 51 and 64. Thus when the control element means 40 is closed, power is applied to the relay means 38. FIG. 1 illustrates that when the control element means 40 is in the open, heat, position, the first motor winding means 31 is interconnected through switching contact 61, terminal 45 and conductor 52 to the first sensor contact means 21. Simultaneously the second motor winding means 32 is connected through switching contacts 62, terminal 43 and conductor 53 to the second sensor contact means 22. However, when the control element means 40 is moved into the closed, cool, position, the relay means 38 is energized and the switching contacts 61 and 62 are connected to terminals 46 and 44, respectively, in which case the first motor winding means 31 is connected to the second sensor contact means 22 and the second motor winding means 32 is connected to the first sensor contact means 21. Thus the reversing switch means 38 reverses the connection of the first and second motor winding means 31 and 32 with the first and second sensing contact means 21 and 22. Although the invention as illustrated in FIG. 1 shows the reversing switch means to be a relay, the term reversing switch means as contemplated by the inventor is not limited to such a device but also includes solid state switching devices such as SCR's, triacs and the like. The reversing switch means 38 is shown as being mounted within the mounting means 35 in FIGS. 1 and 4 in order to facilitate the simultaneous switching of a plurality of control means between the heating and the cooling position as hereinafter explained.

The temperature control device illustrated in FIGS. 1 and 4 operates in the following manner. During cold weather when it is necessary to furnish only heat, the central heating and cooling unit produces warm air to flow through the air ducts and the control element means 40 remains in the heat position. If the temperature within a given zone is above the first reference temperature, the temperature responsive means 23 will bend in the direction illustrated by arrow 49 to contact the first sensor contact means 21. When the temperature responsive means 23 contacts the first sensor contact means 21, the first motor winding means 31 is energized to decrease the aperture of the movable member means 33 to decrease the warm air flow therethrough. Conversely, when the temperature is below the second reference temperature, the temperature responsive means 23 will contact the second sensor contact means 22 to energize the second motor winding means 32 whereby the aperture of the movable member means 33 will be increased to allow more warm air therethrough. During warm weather when it is only necessary to furnish cool air, the central heating and cooling unit produces cool air to flow through the air ducts and the control element means 40 is placed in the cool position, thus energizing the reversing switch means 38. When the temperature increases above the first reference temperature, the temperature responsive means 23 again contacts the first sensor contact means 21 which energizes the second motor winding means 32 of the motor means 34 to increase the aperture of the movable member means 33 to allow more cool air flow therethrough. Conversely when the temperature is below the second reference temperature, the temperature responsive means 23 is in contact with the second sensor contact means 22, to energize the first motor winding means to decrease the aperture of the movable member means and to decrease the cool air flow therethrough. Thus, the control element means 40 compensates to reverse the function of the movable member means 33 depending upon whether cool air or hot air is being generated by the central heating and cooling unit.

Figure 2:
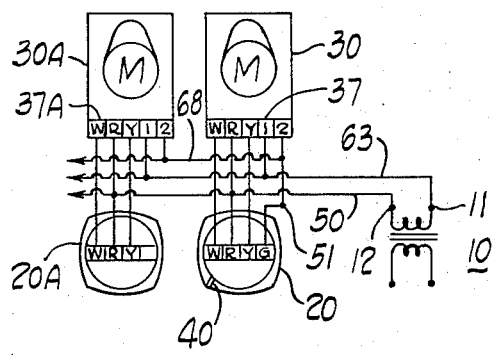
FIG. 2 illustrates a plurality of temperature control devices with a manual changeover.

FIG. 2 illustrates a temperature control device for heating and cooling a plurality of zones wherein a first zone has a sensor means 20 and a control means 30 and a second zone has a sensor means 20A and a control means 30A wherein each of the zones is powered by the power means 10. The control element means 40 is shown located in proximity to the sensor means 20 but this location is purely arbitrary and can be located in any convenient location. Each zone has an individual control means having reversing switch means therein and sensor means to control the heating and cooling in that given zone. When the control element means 40 is switched from the heat to the cool position, the G terminal strip 24 is connected to the second source terminal 12 of power means 10 thus applying the power between terminals 1 and 2 of terminal strip 37. Connector 68 interconnects the No. 2 terminals of the terminal strips 37 and 37A such that when the control element means 40 is switched into the cool position, the reversing switch means in both the control means 30 and 30a are switched into the energized position. Therefore, a single control element means 40 switches a plurality of zone temperature control devices in accordance with whether hot or cool air is flowing through the air ducts. This is a desirable feature in an installation having many individual zones and a single central unit so that each zone need not be individually changed from cool position to heat position.

Figure 3:
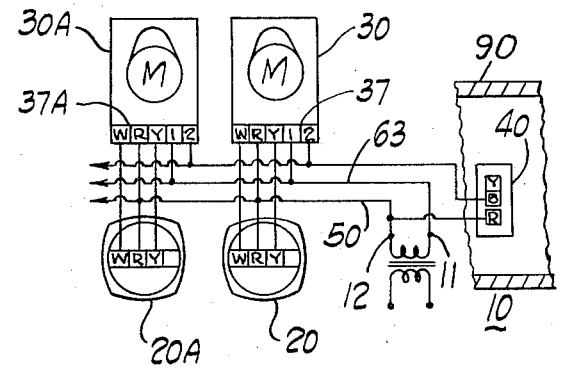
FIG. 3 shows a plurality of temperature control devices with an automatic changeover.

FIG. 3 illustrates a modification of the invention described in FIGS. 1, 2, 4 and 5 wherein the control element means 40 is mounted within an air duct 90 to sense whether hot or cool air is being produced by the central heating and cooling unit. This control element means 40 could be a bimetallic member or a semiconductor temperature sensor means coupled to a semiconductor switch or a relay. When cool air is flowing through the air ducts 90, the control element means 40 interconnects the R and B terminals of the control element means 40 to thereby apply voltage from the power means 10 to each the first and second terminals of the terminal strip 37, 37A to energize the reversing switch means therein.

A device constructed in accordance with this invention has a response time of the movable member means 33 between a maximum to a minimum aperture of approximtely 15-20 minutes. This slow response is very desirable to produce a modulating action and to prevent oscillation of the movable member means due to transient changes in temperature. Assume a zone to be an office located in a building having a central unit producing cold air and further assume that upon opening the office in the morning, the temperature is stabilized in accordance with the pre-selected temperature which has been set in the zone sensor means. During this period of time when the temperature is stabilized, the temperature responsive means 23 will be in a dead zone betwee the first and second sensor contact means 21 and 22 and neither motor winding means 31 and 32 will be energized. As the day progresses and the temperature rises within the zone, the second motor winding means 32 is energized to slowly increase the aperture of the movable member means 33 until the temperature responsive means 23 is again within the dead zone whereat the movable member means 33 will stop and remain in a position having a larger aperture than when the office was unoccupied. The slow response of the temperature control device produces a modulating action of the movable member means 33 thus requiring the motor means 34 to be activated only a small portion of the time. The foregoing specification has described a temperature control device which is applicable to zone heating and cooling systems which has a manual or an automatic changeover from a heating to a cooling system. The system not only eliminates the need for limit switches but also reduces the complexity and the material requirements for interconnection within and between each zone. In addition the foregoing specification discloses a system which is simple, reliable, inexpensive and has a low-power consumption due to a modulating action.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A temperature control device for a heating and cooling air flow system having an air duct, comprising in combination, power means having a first and a second source terminal, sensor means, control means, and control element means having a first and a second position;

said sensor means including;

first and second sensor contact means, temperature responsive means connecting said first sensor contact means to said second source terminal when the ambient temperature is above a first reference and connecting said second sensor contact means to said second source terminal when the ambient temperature is below a second reference, said control means including;

movable member means to vary the aperture of the air duct to control air flow therethrough, motor means having a first and second motor winding means, mounting means mounting said motor means to the air duct, means connecting said motor means to said movable member means to decrease the aperture when said first motor winding means is energized and to increase the aperture when the second motor winding means is energized, means connecting said motor means to said first source terminal, reversing switch means interconnecting said motor means and said sensor contact means;

and said control element means controlling said reversing switch means to connect said first and second motor winding means to said first and second sensor contact means, respectively, when in said first position and connecting said first and second motor winding means to said second and first sensor contact means, respectively, when in said second position.

2. A temperature control device as set forth in claim 1, wherein saie control element means is mounted in proximity to said sensor means.

3. A temperature control device as set forth in claim 1, wherein said control element means includes temperature probe means mounted in the air duct to automatically control said reversing swtich means in accordance with whether there is hot or cool air in the air duct.

4. A temperature control device as set forth in claim 1, wherein said first reference temperature is greater than 1° above said second reference temperature.

5. A temperature control device as set forth in claim 1, wherein said reversing switch means is mounted in said mounting means.

6. A temperature control device for a heating and cooling air flow system having an air duct, comprising in combination, power means,
control means
sensor means,
and control element means;
said control means including;
movable member means to vary the aperture of the air duct to control air flow therethrough,
motor means rotatable in a first and a second direction,
means connecting said motor means to said movable member means to decrease the aperture during movement in said first direction and to increase the aperture during movement in said secnd direction.

reversing switch means interconnecting said motor means to said sensor means;
said sensor means including;
temperature responsive means connecting said motor means to said power means to cause rotation in said one of said directions when the ambient temperature is above a first reference and to cause rotation in the other of said directions when the ambient temperature is below a second reference,
and said control element means controlling said reversing switch means to reverse the interconnection of said motor means and said sensor means to interchange the aforementioned directions relative to said first and second references.

7. A zone temperature control device for heating and cooling a plurality of zones wherein each zone is connected through an air duct to a central air flow source, comprising in combination, power means having a first and a second source terminal,
sensor means for each zone,
control means for each air duct,
and control element means having a first and second position;
said sensor means each including;
first and second sensor contact means,
temperature responsive means connecting said first sensor contact means to said second source terminal when the ambient temperature is above a first reference and connecting said second sensor contact means to said second source terminal when the ambient temperature is below a second reference;
said control means each including;
movable member means to vary the aperture of the air duct to control air flow therethrough,
motor means having first and second motor winding means,
mounting means mounting said motor means to the air duct,
means connecting said motor means to said movable member means to decrease the aperture when said first motor winding menas is energized and to increase the aperture when the second motor winding means is energized,
means connecting said motor means to said first source terminal,
reversing switch means interconnecting said motor means of a given zone to said sensor contact means of said given zone;
and said control element means controlling all of said reversing switch means to connect said first and second motor winding means to said respective first and second sensor contact means, respectively, when in said first position and connecting said first and second motor winding means to said respective second and first sensor contact means, respectively, when in said second position.

8. A temperature control device for a heating and cooling air flow system having air ducts comprising in combination;
power means,
sensor means,
control means,
and control switch means having a first and a second position,
said power means including;
transformer means having a primary and a secondary winding,
said secondary winding having a first and a second source terminal,
said sensor means including;
first and second sensor contact means,
bimetallic means established between said sensor contact means to contact said first sensor contact means during an increased ambient temperature relative to a first reference and to contact said second sensor contact means during a decreased ambient temperature relative to a second reference,
and said control means including;
movable member means mounted in the air duct to control air flow therethrough, motor means having a first and a second motor winding means, mounting means mounting said motor means to the air duct, means connecting said motor means to said movable member means to decrease the air flow through the air duct when said first winding means is energized and to increase the air flow through the air duct when said second winding means is energized.

relay means mounted in proximity to said mounting means, means connecting said first and second motor winding means between said first source terminal of said transformer secondary and said relay means, means connecting said first and second sensor contact means to said relay means, and said control switch means controlling said relay means to connect said first and second motor winding means to said first and second sensor contact means, respectively, when in said first position and connecting said first and second motor winding means to said second and first sensor contact means, respectively, when in said second position.

9. A temperature control device as set forth in claim 8, wherein said means connecting said motor means to said movable member means includes, screw thread means connected to said motor means, arm member means connected to said movable member means engaged with said screw thread means, mechanical stop means on said screw thread means, and bearing washer means adjacent to said arm member means to prevent jamming between said arm member means and said stop means.

* * * * *